(12) United States Patent
Huang

(10) Patent No.: US 7,150,066 B1
(45) Date of Patent: Dec. 19, 2006

(54) WINDSHIELD WIPER STRUCTURE FOR VEHICLES

(76) Inventor: Shih Hsien Huang, 7F. -2, No. 37, Jhengsin St., Zuoying District, Kaohsiung City 813 (TW)

(*) Notice: Subject to any disclaimer, the term of this patent is extended or adjusted under 35 U.S.C. 154(b) by 0 days.

(21) Appl. No.: 11/152,166

(22) Filed: Jun. 15, 2005

(51) Int. Cl.
*B60S 1/38* (2006.01)

(52) U.S. Cl. .............. 15/250.201; 15/250.43; 15/250.32; 15/250.451

(58) Field of Classification Search ......... 15/250.201, 15/250.43, 250.44, 250.451, 250.452, 250.453, 15/250.32
See application file for complete search history.

(56) References Cited

U.S. PATENT DOCUMENTS

| | | | |
|---|---|---|---|
| 6,516,491 B1 | 2/2003 | Merkel et al. ......... | 15/250.201 |
| 6,643,889 B1 | 11/2003 | Kotlarski ............... | 15/250.32 |
| 6,668,419 B1 | 12/2003 | Kotlarski ............... | 15/250.43 |
| 6,687,948 B1 | 2/2004 | Kotlarski ............... | 15/250.32 |
| 6,782,581 B1 | 8/2004 | De Block .............. | 15/250.32 |
| 6,810,556 B1 | 11/2004 | Kotlarski ............... | 15/250.43 |
| 6,836,926 B1 | 1/2005 | De Block .............. | 15/250.43 |
| 6,836,927 B1 | 1/2005 | De Block .............. | 15/250.43 |
| 6,874,195 B1 | 4/2005 | Kotlarski et al. ...... | 15/250.201 |
| 6,886,213 B1 | 5/2005 | Merkel et al. ......... | 15/250.32 |
| 6,904,639 B1 | 6/2005 | Dietrich et al. ........ | 15/250.43 |
| 6,910,244 B1 | 6/2005 | Block et al. ........... | 15/250.32 |
| 2004/0010882 A1 | 1/2004 | Breesch et al. ........ | 15/250.201 |
| 2004/0025280 A1 | 2/2004 | Krickau et al. ........ | 15/250.32 |
| 2004/0098821 A1 | 5/2004 | Kramer et al. ......... | 15/250.201 |
| 2004/0111820 A1* | 6/2004 | Aoyama et al. ....... | 15/250.201 |
| 2004/0181894 A1* | 9/2004 | Lee et al. .............. | 15/250.201 |
| 2004/0211021 A1 | 10/2004 | Weber et al. ........... | 15/250.32 |
| 2004/0216260 A1 | 11/2004 | Genet et al. ........... | 15/250.32 |
| 2005/0011033 A1 | 1/2005 | Thomar et al. ........ | 15/250.201 |
| 2005/0039292 A1 | 2/2005 | Boland et al. ......... | 15/250.32 |

* cited by examiner

*Primary Examiner*—Gary K. Graham
(74) *Attorney, Agent, or Firm*—Bacon & Thomas, PLLC

(57) ABSTRACT

A windshield wiper structure for vehicles includes a truss saddle, a bow elastic stripe, a cover body, some detachable clamping devices, a strip scraper and a frame cover. Hollow pressure adjusting vents are created on said bow elastic stripe in order to keep nearly the same elasticity at every section of said bow elastic stripe. Hence, force can be equalized in every portion of the whole wiper thereby achieving even pressure distribution. As a result, the contact between the strip scraper and the windshield glass is uniformly tight and hermetic to enhance the scraping effect of the windshield wiper as the effect of prolonging service-lifetime while reducing expenses associated with wiper replacement, thereby providing enhanced economy and environmental protection.

1 Claim, 12 Drawing Sheets

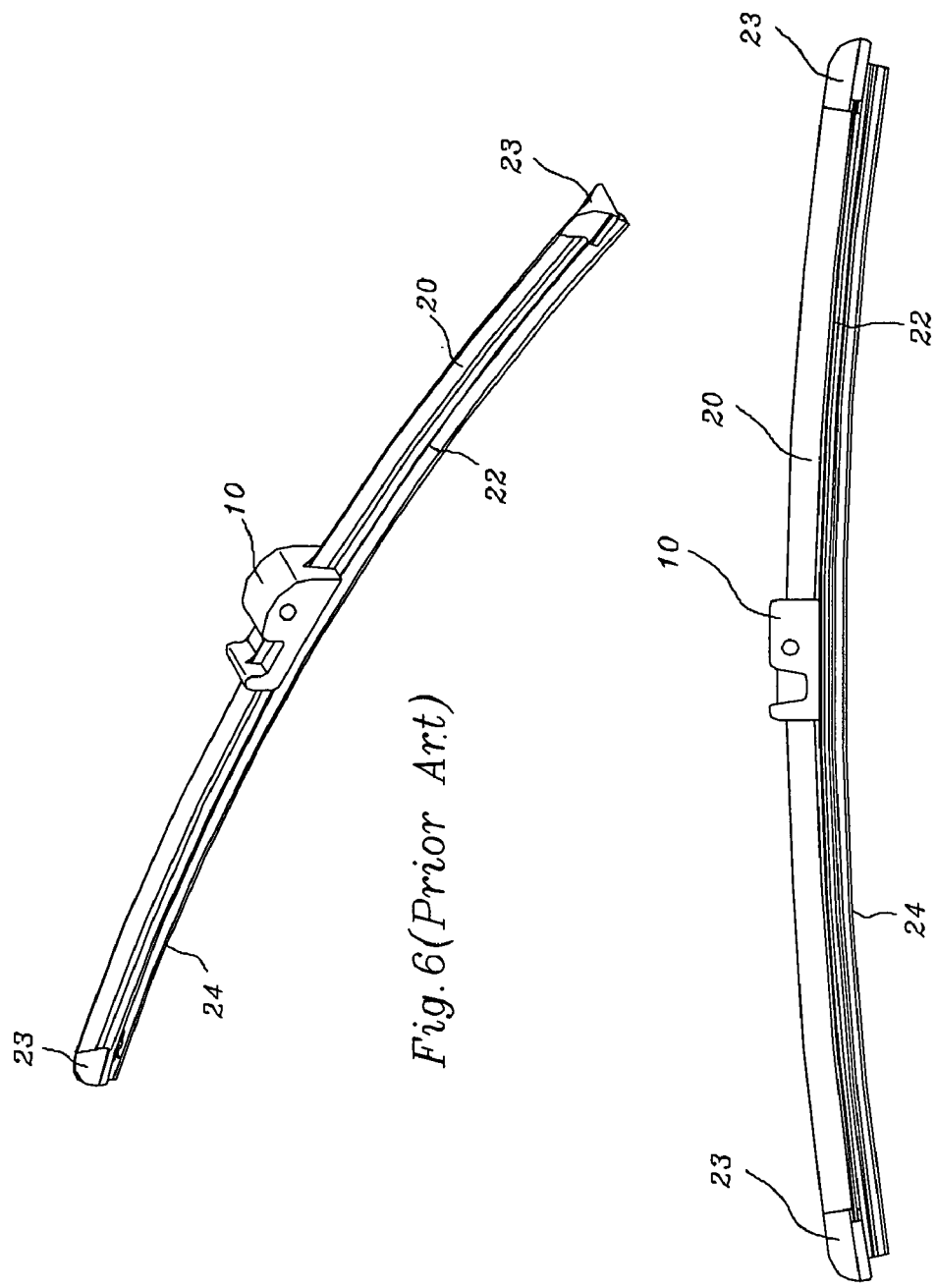

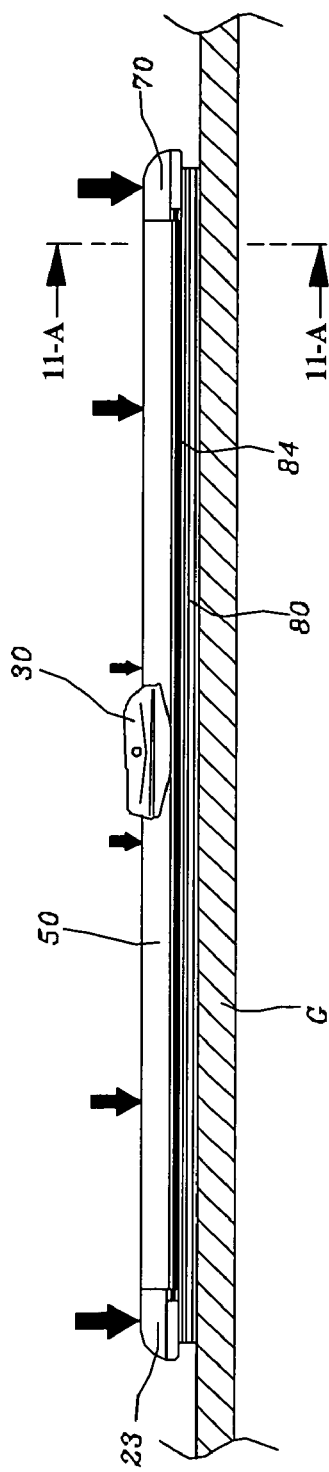
Fig.11 (Prior Art)
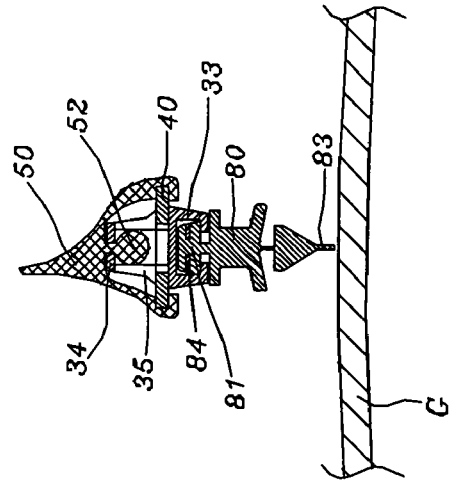
Fig.11-A (Prior Art)

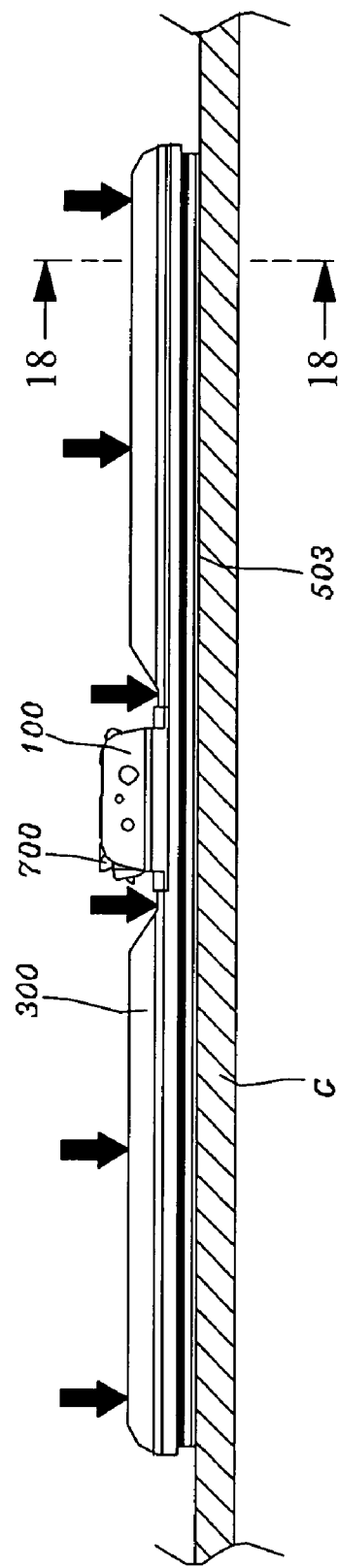
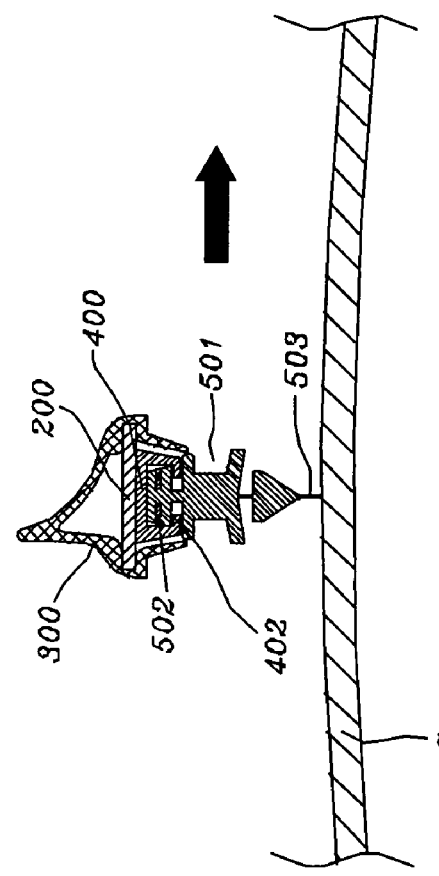
Fig. 17
Fig. 18

WINDSHIELD WIPER STRUCTURE FOR VEHICLES

FIELD OF THE INVENTION

The present invention relates to a windshield wiper structure for vehicles. More particularly the contact between the scraper of windshield wiper and the windshield glass is holistically even tight uniformly and hermetic closely to enhance the scraping effect of windshield wiper as well as the effect of no noise in scraping action. And it can simplify the assembly process and reduce the process time in production due to simple structure and fewer parts so that decreasing the waste in wearing and damage of trivial parts. Hence, it has much more effects in economy and environment protection.

BACKGROUND OF THE INVENTION

Referring to FIG. 1 to FIG. 3, the structure of the conventional first kind and second kind of windshield wiper comprises a master wiper 2, in which having a first holding arm 4 being jointed with each articulation 3 on both ends respectively. And, a second holding arm 6 is jointed on the articulation 5 of each inwards end of said both first holding arm 4 respectively. A clamping device 7 is disposed on each outwards end of said both first holding arm 4 and both ends of said both second holding arm 6 respectively. A strip scraper 8 being made of flexible elastic material is clipped by means of these said clamping devices 7. And, a metal elastic stripe 801 (as shown in FIG. 3) is imbedded in order to brace the holding uphold on both sides of said strip scraper 8. Furthermore, on the joint of both ends of said strip scraper 8 and the outwards end of said both first holding arm 4 is securely sleeved by an end ferrule cap 9 respectively as shown in FIG. 1.

When said strip scraper 8 of both aforementioned conventional windshield wiper sweeps back and forth on the windshield G, a gap is created in said articulations 3, which being the joint of said master wiper arm 2 and said both first holding arms 4, and said articulations 5, which being the joint of each inwards end of said both first holding arms 4 and said both second holding arms 6. And, the more frequency by the wiper sweeps, the more gradually enlarged the gap will be. Hence, the linearity among said master wiper arm 2, said first holding arms 4 and said second holding arms 6 eventually loses alignment (as shown in FIG. 4). Consequently, said strip scraper 8 being bent indirectly is disabled to synchronously sweep in linear alignment and losing the effect of clearing off the extraneous impurities or dust. Thus, the turnover of replacing new product is increased. Furthermore, the way of replacement must be whole integral wiper instead of part by part individually. And, the discarded old products become garbage and pollute the environment.

Therefore, the businessmen bring the third kind of conventional windshield wiper (also called no-holding-arm wiper) into the market recently. As shown in FIG. 5 to FIG. 9, the wiper comprises a truss saddle 10, a stripe main body 20, a pair of bow elastic stripes 22, and two end ferrule caps 23. Wherein said stripe main body 20 is firmly clipped by said truss saddle 10 and is unitary-molded made of flexible elastic material. There are multiple strip fluted grooves 21 being formed on both sides of said stripe main body 20 with a unitary-molded (scraper edge 24 at its undermost side). And, said pair of bow elastic stripes 22 are made of metal and will be inserted into the uppermost pair of said strip fluted grooves 21 to serve as splint. Furthermore, on the joint of both ends of said stripe main body 20 and the both ends of said both pair of bow elastic stripes 22 is securely sleeved by an end ferrule caps 23 respectively.

Referring to FIG. 7 to FIG. 9, when said third conventional windshield wiper sweeps back and forth on the windshield G in tight pressure contact, said truss saddle 10 becomes the prime force-acting point (as shown in FIG. 8). Thus, the scraping pressure of the said wiper on said windshield G gradually increases lengthwise from said central truss saddle 10 toward both ends (as shown of black arrow in FIG. 8). Hence, the pressure of every contact point in said scraper edge 24 is not even distributed uniformly and not tightly contact with said windshield G. Consequently, the scraping effect of said wiper is diminished. Either, the noise due to the friction with said windshield G increases to affect the internal tranquility in the car contrarily.

Besides, said scraper edge 24, which being unitary-molded made of flexible elastic material, is splinted with said metal bow elastic stripes 22 on its both sides to bend itself. When said wiper sweeps back and forth, said both bow elastic stripes 22 bear different push and pull forces everywhere due to exchange of along or against motion direction. So that said whole wiper is tilted and bent distorted in consequence of action of squeeze and extract on said strip fluted groove 21 (as shown in FIG. 9). Contrarily, it decreases the lifetime of said stripe main body 20 without practicality. Moreover, said end ferrule caps 23 is to sleeve and buckle the snap-on notch 221 on both ends of said both bow elastic stripes 22. It can be easily fallen off unexpectedly in consequence of being deformed in aforementioned motion. Consequently, the separation of said bow elastic stripes 22 from said stripe main body 20 will happen to disable said wiper function in uselessness.

Accordingly, some other business men introduces the fourth kind of no-holding-arm wiper as shown in FIGS. 10, 10-A, 10-B, 11 and 11-A, and 12-A to 12-E, which comprises:

a truss saddle 30;

a bow elastic stripe 40, which being made by metal bow stripe, is securely jointed with the base side of said truss saddle 30 at its central upper side; On its surface, some square holes 41 are evenly punched; Near its both ends, a snap-on hole 42 is created respectively;

two stripe main body 50, which being unitary-molded made of flexible elastic material, is securely caught on said bow elastic stripe 40 at both sides of said truss saddle 30; At two sides of its bottom, a indented grapple stripe 51 is created correspondingly; At the internal top center of said indented grapple stripe 51, a cone-shaped suspending bracket stripe 52 is built some detachable clamping devices 60 are securely buckled in each said square hole 41 respectively on said bow elastic stripe 40; On its upper section, a pair of protruding lugs 61 are created in cross sectional shape of trapezoid; On the center in each of said both protruding lug 61, a elastic barb 62 is created; On its lower section, a pair of jaw-like paws 63 is built;

two end ferrule caps 70 securely sleeves and buckles in each said snap-on hole 42 on both ends of said bow elastic stripe 40; On the center of its bottom, a spline buckle plate 71 is built internally; At each free end of said spline buckle plate 71, a snap-on lug 72 is created to be buckled in said snap-on hole 42 (as shown in the sectional view taken along the direction indicated by a line B—B as shown in FIG. 10.); And a strip scraper 80 is unitary-molded made of flexible elastic material; On its upper section, a pair of strip fluted grooves 81 are created at its both sides in order to be securely caught and inserted by said jaw-like paw 63 of said detachable clamping device 60; Between said strip fluted groove 81 and its top side, a pair of metal elastic stripes 82 is mounted at both sides; A pair of elastic splint rods 84 are inserted into said strip fluted grooves 81 respectively; On its lower section, a scraper edge 83.

Said fourth kind of conventional windshield wiper is contrived by combining said conventional first kind, second kind and third kind of windshield wipers. Its advantage in replacing wiper is need to replace worn strip scraper 80 only instead of replacing whole integral wiper while said conventional first kind, second kind and third kind of windshield wipers have to replace whole integral wiper if any part being worn. In comparing one another, said fourth kind of conventional windshield wiper possesses advantages in expanses of environmental protection and replacing new product by consumers. It is also better in serving lifetime and scraping effect. However, it still exists some drawbacks as below.

1. Referring to FIGS. 11 and 11-A, just like said third conventional windshield wiper, said truss saddle 30 serves as force-acting point in the pressing contact of bow elastic stripe 40 with windshield G. So that the pressure in both end points of said strip scraper 80, which being at the bottom side of said bow elastic strip 40 is strongest compared with every other point. Thus, neither the scraping effect can be maintained nor the internal car tranquility can be sustained due to noise of friction with windshield G in consequence of every point not possessing even pressure distribution and closed tight contact with the surface of said windshield G.

2. Referring to FIG. 12, sections A to E, and FIGS. 10 and 10-A, the process steps of assembly are illustrated as below:

a. One by one, insert and buckle said protruding lug 61 of said detachable clamping device 60 into said square hole 41 of said bow elastic stripe 40 (as shown in the section A of the FIG. 12).

b. Push said detachable clamping device 60 from the bottom of said jaw-like paw 63 such that said elastic barb 62 being pressed and bent inwards (as shown in the section B of the FIG. 12). Continue to push it up to said elastic barb 62 passing through said square hole 41 and bouncing to its original status as well as being buckled in said square hole 41 (as shown in the section C of the FIG. 12).

c. Guide and sleeve said two stripe main bodies 50 into bow elastic stripe 40. During this process, careful to keep said indented grapple stripes 51 and suspending bracket stripe 52 dovetail with both side of said bow elastic stripe 40. And, to slide and sleeve them into said protruding lugs 61 of said detachable clamping device 60 (as shown in the section D of the FIG. 12).

d. After said two stripe main bodies 50 have been wholly sleeved with said bow elastic stripe 40, put and buckle said end ferrule cap 70 at both ends of said bow elastic stripe 40. So that said snap-on lugs 72 at the bottom side of said end ferrule cap 70 are completely inserted and buckled into said snap-on holes 42 of said bow elastic stripe 40 (as shown in the section E of the FIG. 12).

e. Finally, put and insert said strip scraper 80 into said jaw-like paw 63, which being the lower section of said detachable clamping device 60. And, put and insert said two elastic splint rods 84 into said strip scraper 80. All assembly process finishes here (as shown in the section F of the FIG. 12).

It is learnt from the above assembly process that the two stripe main bodies 50 must carefully with directionality in assembly and avoid to caused an error place by an incorrect direction. Therefore, the man-hour in assembly of the main bodies 50 is much more due to directionality in step c.

3. Referring to the section E of the FIG. 12 and the sectional view taken alone a line 10-A—10-A of the FIG. 10, said suspending bracket stripe 52, which being downwards formed in the internal top center of said stripe main bodies 50, is to serve as stopper. Its function is to block said elastic barb 62, which being in said protruding lug 61 of said detachable clamping device 60, from bending inwards. Thus, it prevents said stripe main bodies 50 from dropping off from said square hole 41 of said bow elastic stripe 40. Hence, its material should be non-elastic hard material instead of same flexible elastic material as that used by said stripe main bodies 50. Therefore, it not only causes extra expense in extruding process of mold but also increases the difficulty in production process, which also relatively results in elevation of production cost.

4. Usually, the windshield wiper in the market should be passed by erosion-resistant weather test to make sure it can stand being battered by the wind and the rain in practical car-driving usage. All said detachable clamping devices 60 in said fourth kind of conventional windshield wiper are directly exposed without any weather-stripping protective design such that being easily beaten by different degree of the wind and the rain during practical car-driving usage. Hence, it causes the increase of damage rate in consequence of bad erosion-resistant capability. Thus, its service lifetime is indirectly decreased and resulting in drawback of need to replace it early.

SUMMARY OF THE PRESENT INVENTION

The primary objective of the present invention is to provide a windshield wiper structure for vehicles, which comprises a truss saddle, a bow elastic stripe, a cover body, some detachable clamping devices, a strip scraper and a frame cover; wherein, some hollow pressure adjusting vents are created on said bow elastic stripe in order to keep nearly same elasticity at every sections of said bow elastic stripe. Hence, it can equilibrate force in every portions of whole wiper such that achieving in adjust-effect of even pressure distribution. Thus, the contact between said strip scraper and the windshield glass is holistically even tight uniformly and hermetic closely to enhance the scraping effect of windshield wiper as well as the effect of prolonging service-lifetime with reducing expense in association with decreasing of replacing new product frequency in consequence of such even pressure distribution.

Another object of the present invention is to provide a windshield wiper structure for vehicles, wherein, said cover body is unitary-molded such that freeing from directionality as sleeve it with said bow elastic stripe up to completely matched. Hence, it substantially simplifies assembly process and decreases man-hour in production. Moreover, a pair of weather-stripping fasciae are contrived at bottom section of said cover body to prevent all detachable clamping devices from being battered by the wind and the rain as well as weathering such that prolonging its service-lifetime in consequence of promoting erosion-resistant capability.

The other object of the present invention is to provide a windshield wiper structure for vehicles, wherein, all said detachable clamping devices are directly riveted on said bow elastic stripe without any extra bracing design such that simplifying the structure of said cover body. Thus, total production cost can be substantially decreased in consequence of simplifying the production process.

The features and the advantages of the present invention will be more readily understood upon a thoughtful deliberation of the following detailed description of the present invention with reference to the accompanying drawings.

BRIEF DESCRIPTION OF THE DRAWINGS

FIG. 6 is a perspective view of the third kind of conventional windshield wiper.

FIG. 7 is a schematic view of the third kind of conventional windshield wiper.

FIG. 10-A is a sectional view taken along the direction indicated by line 10-A—10-A as shown in FIG. 10.

FIG. 10-B is a sectional view taken along the direction indicated by line 10-B—10-B as shown in FIG. 10.

FIG. 11 is the functional view of the fourth kind of conventional windshield wiper in action.

FIG. 11-A is a sectional view taken along the direction indicated by a line 11-A—11-A as shown in FIG. 11.

FIG. 13 is an exploded perspective view according to the preferred embodiment of the present invention.

FIG. 17 is the functional view according to the preferred embodiment of the present invention in acting.

FIG. 18 shows a sectional view taken along the direction indicated by a line 18—18 as shown in FIG. 17.

DETAILED DESCRIPTION OF THE PREFERRED EMBODIMENT

Figure 1:
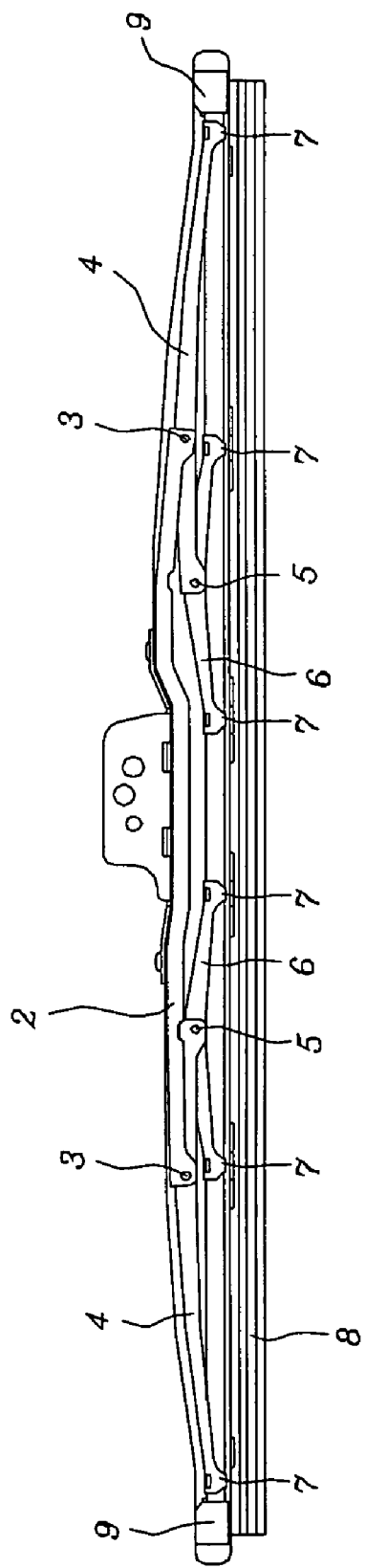
FIG. 1 shows a schematic view of the first kind of conventional windshield wiper.
Figure 2:
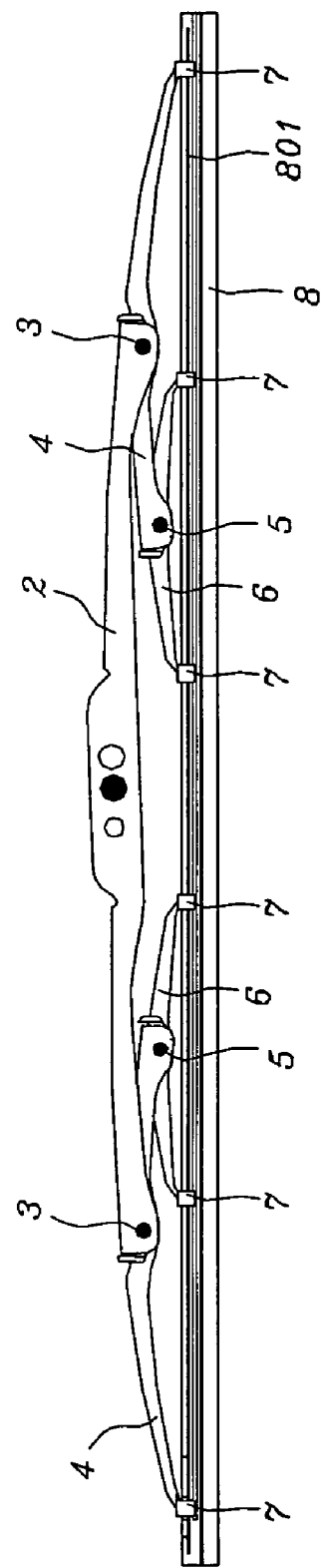
FIG. 2 shows a schematic view of the second kind of conventional windshield wiper.
Figure 3:
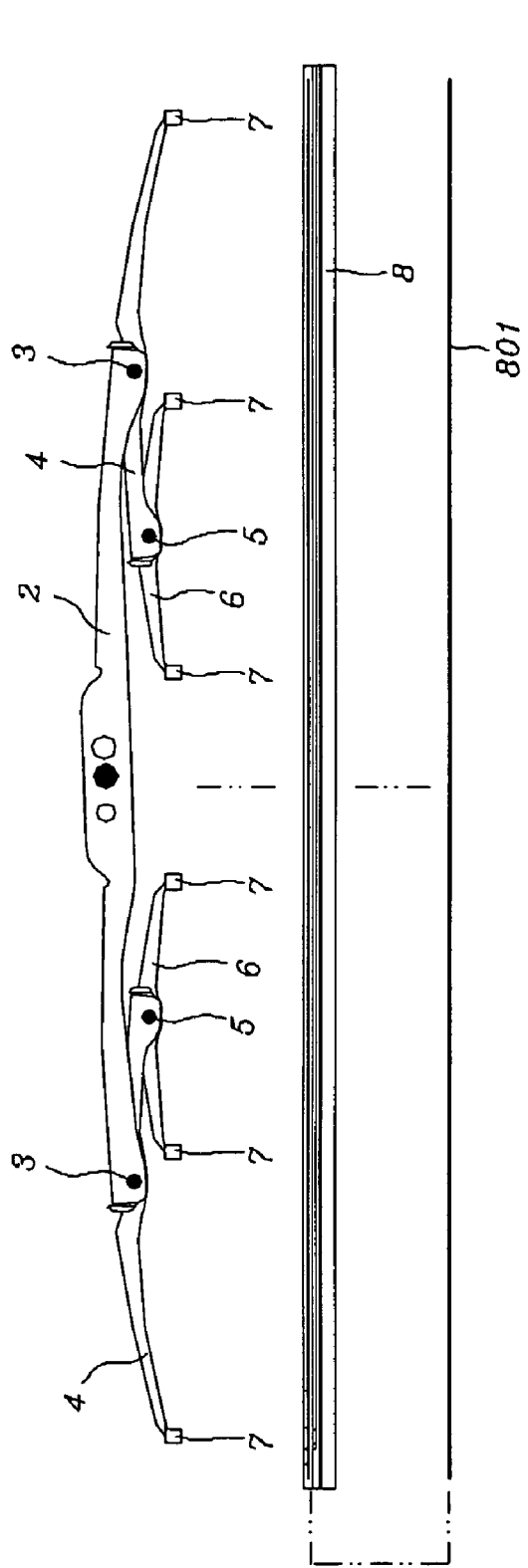
FIG. 3 is a exploded view of the FIG. 2 in partially.
Figure 4:
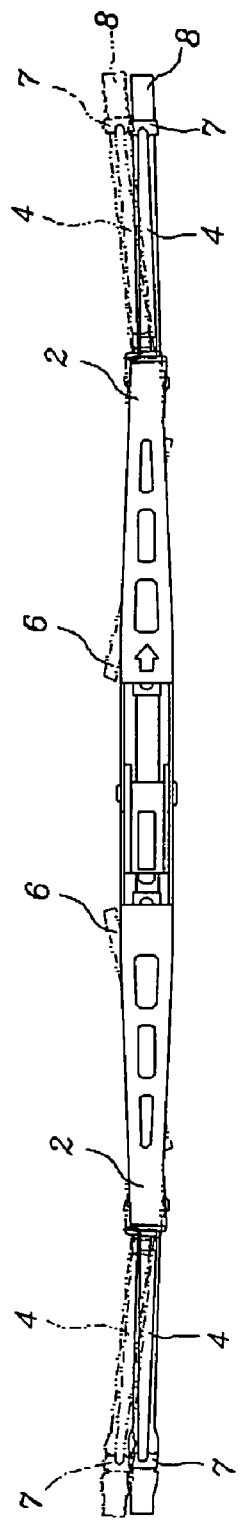
FIG. 4 is a top view of the second kind of conventional windshield wiper.
Figure 5:
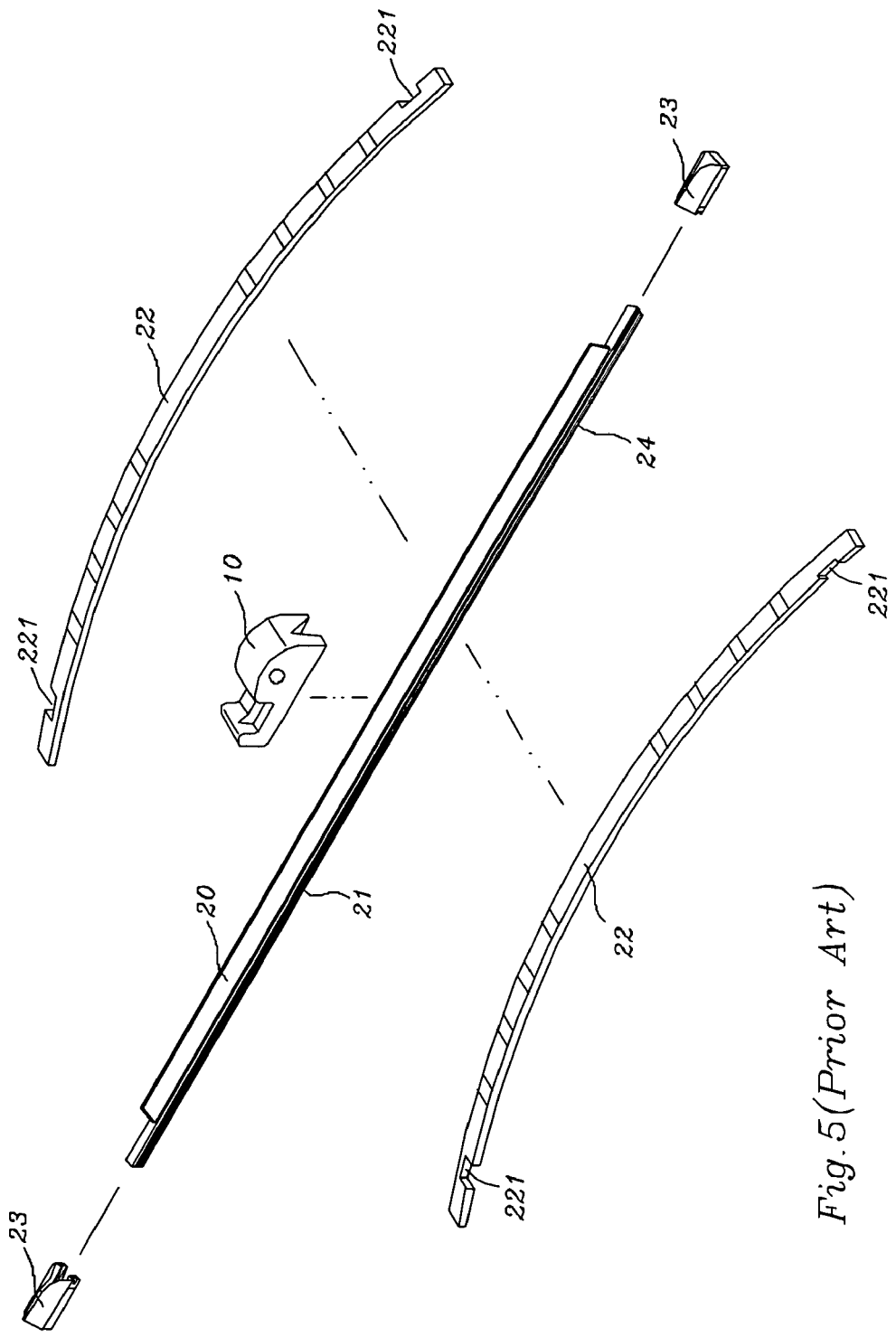
FIG. 5 is an exploded perspective view of the third kind of conventional windshield wiper.
Figure 8:
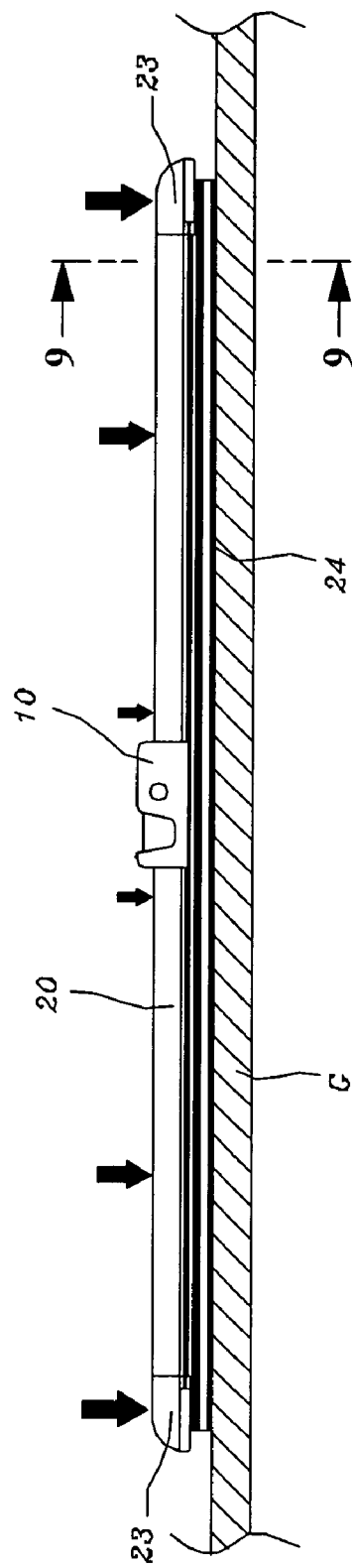
FIG. 8 is the functional view of the third kind of conventional windshield wiper in action.
Figure 9:
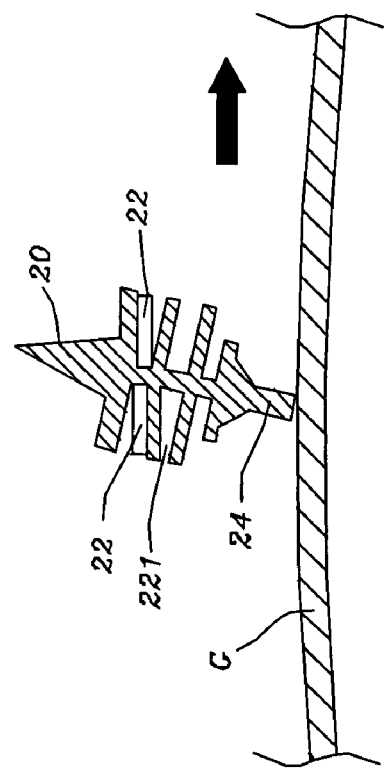
FIG. 9 show a sectional view taken along the direction indicated by line 9—9 as shown in FIG. 8.
Figure 10:
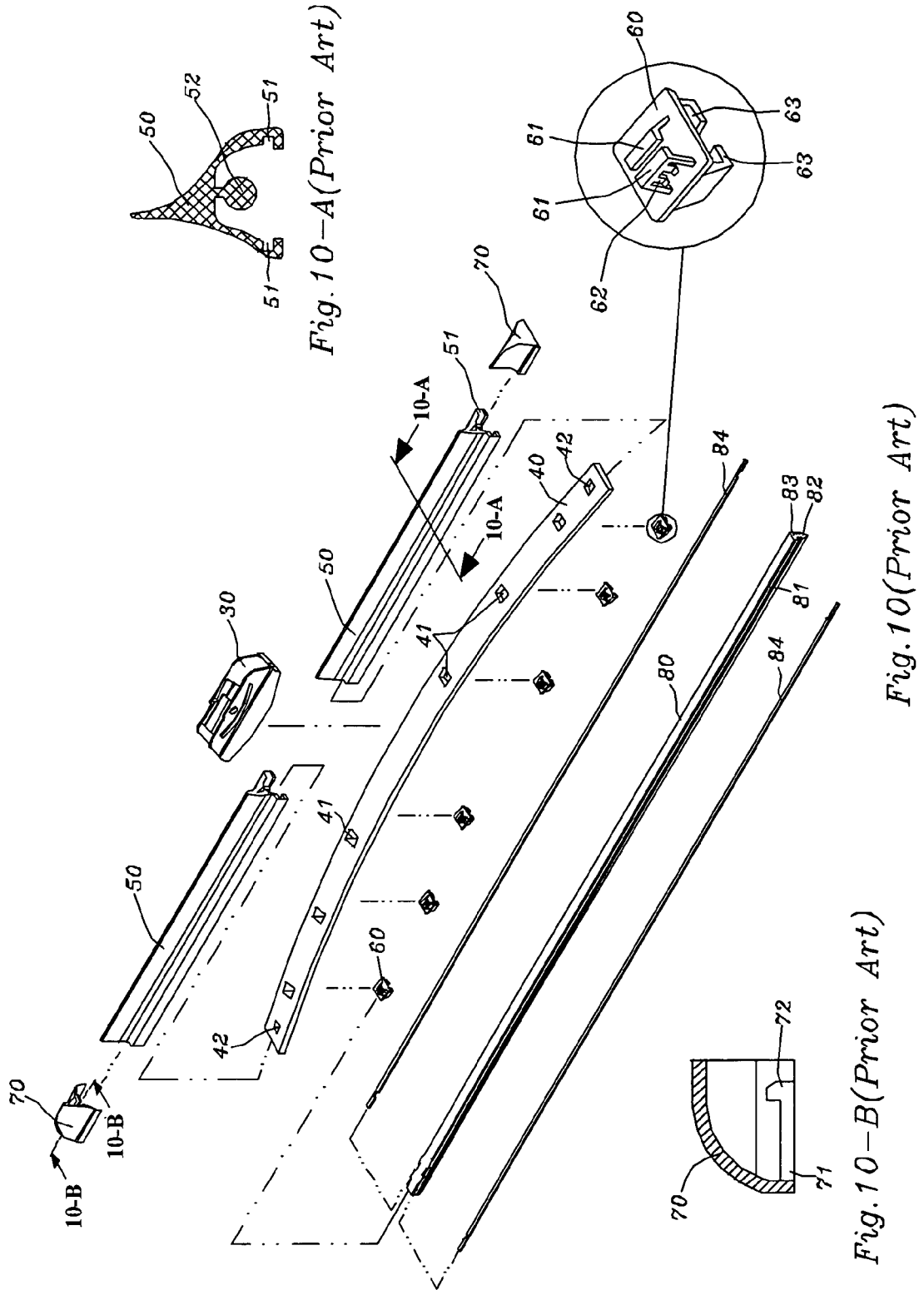
FIG. 10 is an exploded perspective view of the fourth kind of conventional windshield wiper.
Figure 12:
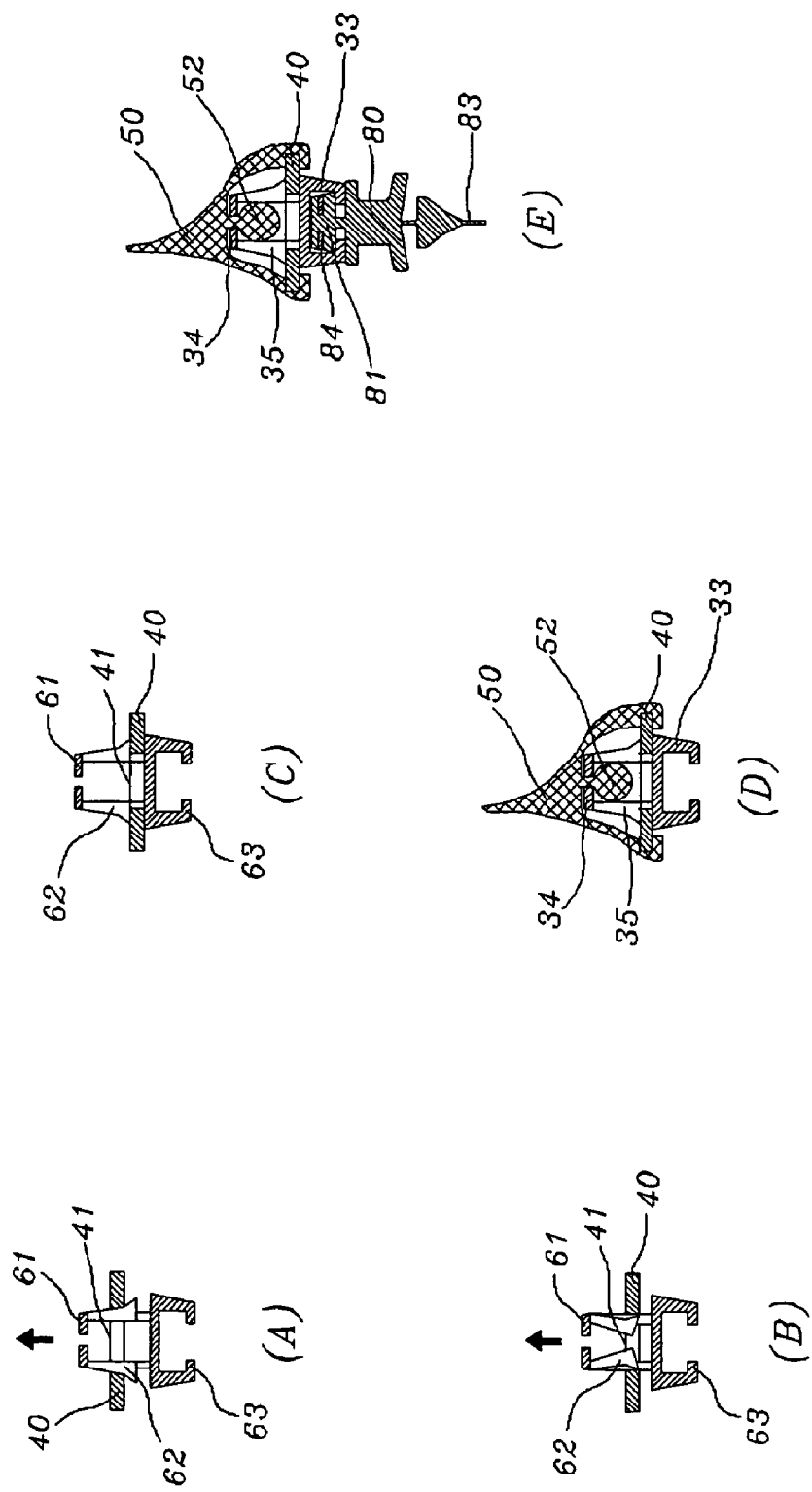
FIG. 12, sections A to E, shows enlarged sectional schematic views of the fourth kind of conventional windshield wiper in an assembly process.
Figure 13:
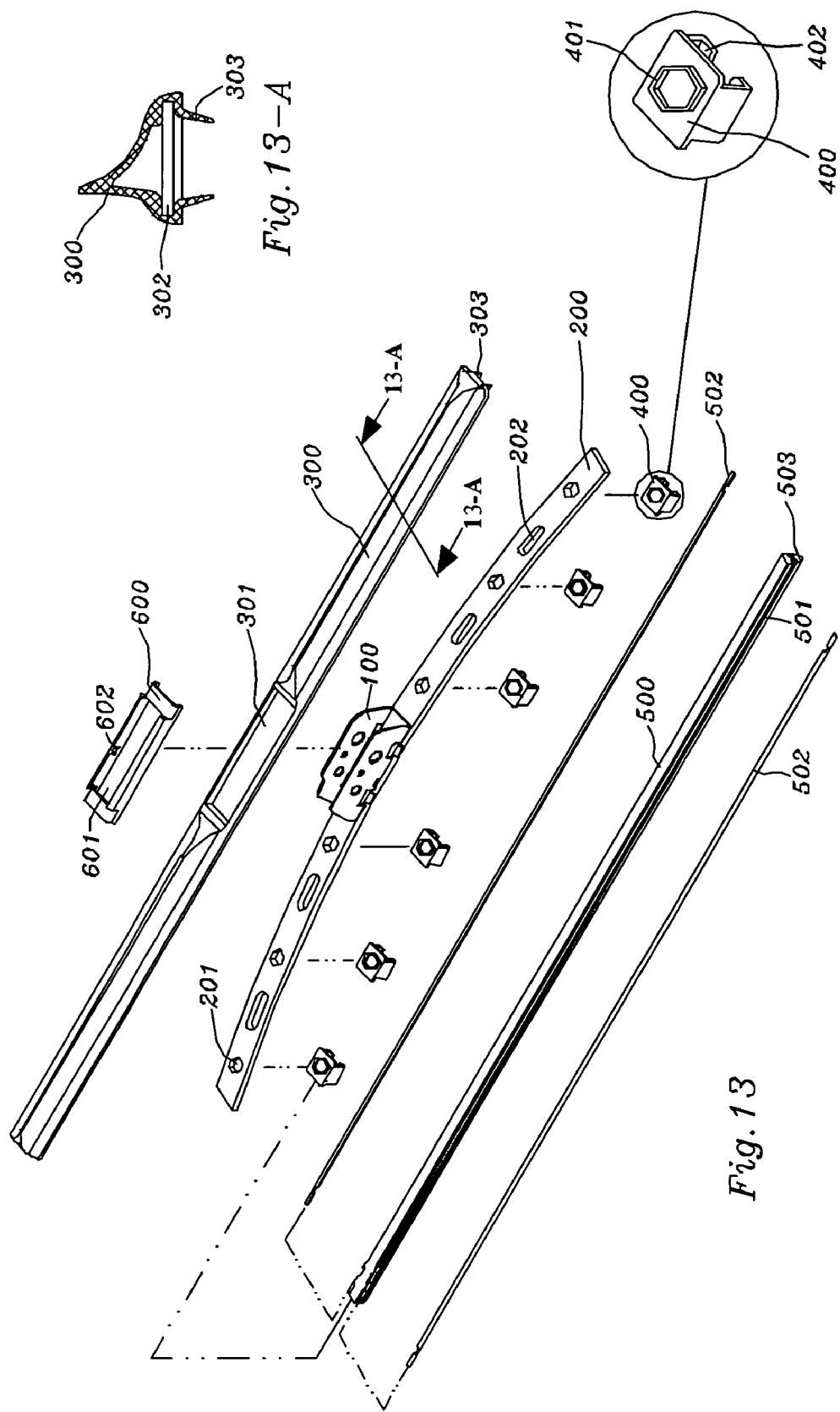
FIG. 13-A is a sectional view taken along the direction indicated by a line 13-A—13-A as shown in FIG. 13.

Referring to FIGS. 13, 13-A, 14, 15, 16 and 17, a windshield wiper structure for vehicles according to a preferred embodiment of the present invention comprises a truss saddle 100, a bow elastic stripe 200, a cover body 300, a plurality of detachable clamping devices 400, a strip scraper 500 and a frame cover 600; wherein the truss saddle 100 is fixed on one end of the wiper arm (not shown in the figures) by means of wiper connector 700; the bow elastic stripe 200, is made of metal and is bow-shaped bending downward, and tightly affixed on the bottom side of the truss saddle 100 with a bottom surface of the truss saddle 100 abutting a central top surface of the bow elastic stripe 200. Referring to FIG. 13, 13-A the bow elastic stripe 200 has a plurality of polygon holes 201 punched on its body equidistantly, and has a plurality of hollow pressure adjusting vents 202 between said polygon holes 201 having an aperture size determined in coordination with even pressure distribution.

Referring to FIGS. 13, 13-A and 14, the cover body 300 is unitary-molded made of flexible elastic material, and is provided at the center with a hollow opening 301 which has an aperture size bigger than the truss saddle 100 but smaller than the frame cover 600. As shown in an enlarged sectional view taken along the direction indicated by a line E—E of FIG. 13, the upper portion of said cover body 300 is formed of an upward tapered shape and middle portion has a pair of strip fluted grooves 302 with a dovetail shape which is holding both sides of said blow elastic stripe 200, wherein said bottom portion has a pair of weather-stripping fasciae 300 which extend downwardly at both sides in connection with said strip fluted grooves 302.

Referring to FIGS. 13 and 13-A, the detachable clamping device 400 has a polygon protruding ring 401 protruded at a top end thereof for fitting into the polygon hole 201 of the bow elastic stripe 200, and has a pair of jaw-like paws 402 protruded at a bottom end thereof for claiming the strip scraper 500.

Referring to FIGS. 13, 13-A and 14, the strip scraper 500 is unitary-molded made of flexible elastic material, and has a pair of strip fluted grooves 501 which are concaved at its both sides of the upper portion for insert into the jaw-like paw 402 of the detachable clamping device 400, wherein said strip fluted grooves 501 are further provided with two metal elastic splint rods 502 and a scraper edge 503 in connection with said both sides and lower portion of the strip scraper 500 respectively.

Referring to FIGS. 13, 13-A and 14, the frame cover 600 serves as sheath to accommodate said truss saddle 100 and is provided at the center with a rectangular hole 601, and built at the central bottom of both sides with two snap-on noses 602 thereof respectively.

Figure 14:
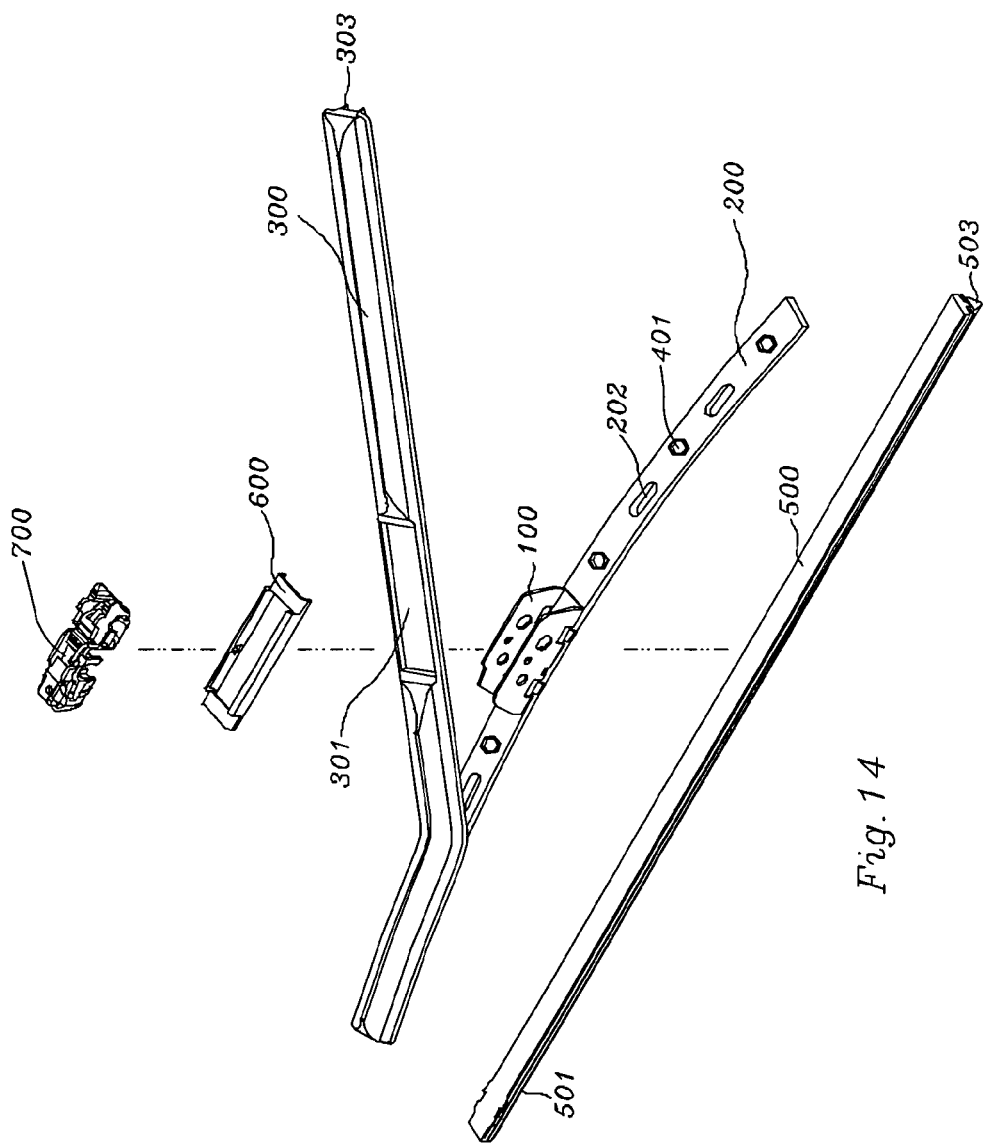
FIG. 14 is a perspective view according to the preferred embodiment of the present invention in assembly.
Figure 15:
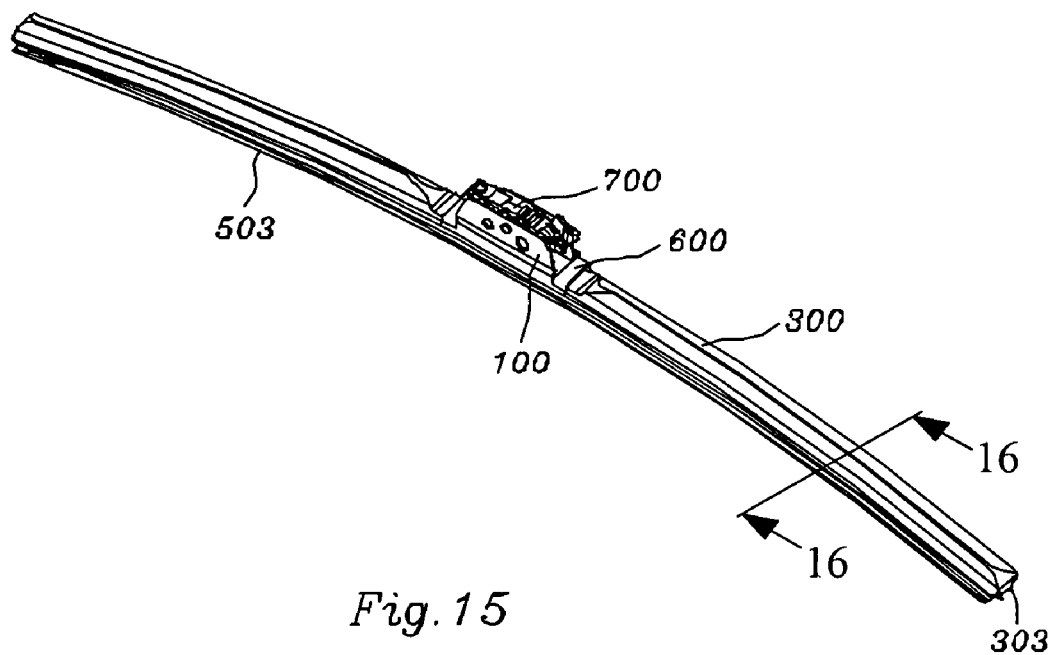
FIG. 15 is a perspective view according to the preferred embodiment of the present invention.
Figure 16:
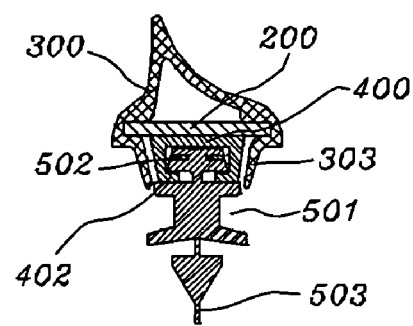
FIG. 16 shows a sectional view taken along the direction indicated by a line 16—16 as shown in FIG. 15.

Referring to FIG. 14 to FIG. 18, the assembly process of the present invention is as below:

a. Insert said polygon lug 401 of each said detachable clamping device 400 into each corresponding said polygon hole 201 on said bow elastic stripe 200 and securely rivet them respectively. Then, solder the bottom side of said truss saddle 100 with central top side of said bow elastic stripe 200.

b. Take any end of said cover body 300 to sleeve into any end of said bow elastic stripe 200. By means of opening up said weather-stripping fascia 303 at the bottom portion of said cover body 300, it can be push inward inch by inch up to completely sheath on said bow elastic stripe 200 (as shown in FIG. 14).

c. Insert said strip scraper 500 into said jaw-like paw 402 at the lower portion of each said detachable clamping device 400 progressively. Then, pass said frame cover 600 through truss saddle 100 until said snap-on nose 602 snap-on and being buckled at the bottom of both sides in said bow elastic stripe 200. Thus, the assembly process of the present invention is finished here (as shown in FIG. 15 and FIG. 16).

It is learnt from above assembly process that the man-hour in assembly of the present invention is very few due to non-directionality of cover body 300 in step b.

Moreover, referring to FIG. 17 and FIG. 18, under the action of said hollow pressure adjusting vent 202 punched on said bow elastic stripe 200, the pressure in every section of said strip scraper 500 is even distributed in equal pressure after it contacts with said windshield G. (as shown of black arrow in FIG. 17). Thus, it not only allow said strip scraper 500 holistically even tight contact uniformly with the bow surface of said windshield G (as shown in FIG. 18), but also enhance the scraping effect as well as reducing friction noise with said windshield G without affecting internal tranquility of driving car.

What is claimed is:

1. A windshield wiper structure for vehicles, comprising a truss saddle, a bow elastic stripe, a cover body, a plurality of detachable clamping devices, a strip scraper, and a frame cover;

wherein said truss saddle is fixed on one end of a wiper arm by means of a wiper connector;

wherein the bow elastic stripe is made of metal, has a bow shape, bends downward, and is tightly affixed to a bottom surface on a bottom side of said truss saddle and abutting a central top surface of said bow elastic stripe;

wherein said bow elastic stripe has a plurality of polygon holes punched into its body equidistantly, and has a plurality of hollow pressure adjusting vents between said polygon holes which have an aperture size determined in coordination with even pressure distribution;

wherein said cover body is unitarily-molded of a flexible elastic material, and is provided at the center with a hollow opening which has an aperture size bigger than said truss saddle but smaller than said frame cover;

wherein the upper portion of said cover body is formed of an upward tapered shape, a middle portion of said cover body has a pair of strip fluted grooves with a dovetail shape which holds both sides of said bow elastic stripe, and a bottom portion of said cover body has a pair of weather-stripping fasciae downwardly extending at both sides in connection with said strip fluted grooves;

wherein each of said plurality of detachable clamping devices has a polygonal protruding ring protruded at a top end of the respective clamping device for fitting into the polygon hole of said bow elastic stripe, and has a pair of jaw-like paws protruded at a bottom end thereof for clamping said strip scraper;

wherein said strip scraper is unitarily-molded of flexible plastic material, and has a pair of strip fluted grooves which are concave at both sides of an upper portion of the strip scraper for insertion into the jaw-like paws of the detachable clamping devices, said strip fluted grooves further provided with two metal elastic splint rods and a scraper edge in connection with said both sides and a lower portion of said strip scraper respectively; and wherein said frame cover serves as a sheath to accommodate said truss saddle and is provided at the center with a rectangular hole, and at a central bottom of both sides of the frame cover with two respective snap-on noses.

* * * * *